United States Patent
Qiang et al.

(10) Patent No.: US 12,210,507 B2
(45) Date of Patent: Jan. 28, 2025

(54) METHOD FOR MONITORING RUNNING STATE OF DISTRIBUTED SYSTEM, DEVICE, AND STORAGE MEDIUM

(71) Applicant: BEIJING BAIDU NETCOM SCIENCE TECHNOLOGY CO., LTD., Beijing (CN)

(72) Inventors: Wei Qiang, Beijing (CN); Wengen Li, Beijing (CN); Jingying Qu, Beijing (CN); Anzhan Zhang, Beijing (CN); Cheng Liu, Beijing (CN); Li Sun, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 192 days.

(21) Appl. No.: 17/907,465

(22) PCT Filed: Sep. 24, 2020

(86) PCT No.: PCT/CN2020/117472
§ 371 (c)(1),
(2) Date: Sep. 27, 2022

(87) PCT Pub. No.: WO2021/203635
PCT Pub. Date: Oct. 14, 2021

(65) Prior Publication Data
US 2023/0153290 A1    May 18, 2023

(30) Foreign Application Priority Data
Apr. 8, 2020    (CN) .......................... 202010269542.4

(51) Int. Cl.
G06F 16/23    (2019.01)
G06F 16/21    (2019.01)

(52) U.S. Cl.
CPC ........ *G06F 16/2365* (2019.01); *G06F 16/219* (2019.01)

(58) Field of Classification Search
None
See application file for complete search history.

(56) References Cited

U.S. PATENT DOCUMENTS

2010/0325077 A1* 12/2010 Higuchi .................. G06F 21/53
706/47
2014/0047438 A1* 2/2014 Da Silva ............... G06F 9/5027
718/1
(Continued)

FOREIGN PATENT DOCUMENTS

CN    103577440 A    2/2014
CN    104991939    10/2015
(Continued)

OTHER PUBLICATIONS

CNIPA, First Office Action for CN Application No. 202010269542.4, Feb. 8, 2023.
(Continued)

*Primary Examiner* — Christopher J Raab
(74) *Attorney, Agent, or Firm* — Hodgson Russ LLP

(57) ABSTRACT

A method for monitoring a running state of a distributed system, an electronic device, and a storage medium are provided. The method comprises: acquiring a first calling key-value pair sent by a first component in a distributed system (101); and determining the current running state of the first component according to a first keyword value, and historical calling data corresponding to a first key code value in a preset database (102).

14 Claims, 5 Drawing Sheets obtaining a first calling key-value pair sent by a first module in a distributed system — 201 determining a query per second, an average consumed time and a quantile consumed time of the first module according to the total number of times the first calling has been executed, the total consumed time of the first calling, a historical total number of callings and a historical total consumed time corresponding to the first key code value in the preset database — 202

(56) References Cited

U.S. PATENT DOCUMENTS

| | | | |
|---|---|---|---|
| 2014/0047440 A1* | 2/2014 | Da Silva | G06F 9/5077 718/1 |
| 2014/0348161 A1* | 11/2014 | Koponen | H04L 43/0823 370/389 |
| 2018/0248820 A1* | 8/2018 | Milyakov | G06F 16/2474 |
| 2019/0007410 A1* | 1/2019 | Hu | H04L 63/0281 |
| 2021/0037140 A1* | 2/2021 | Morgan | H04M 3/42382 |
| 2021/0097043 A1* | 4/2021 | Xiao | G06F 3/064 |
| 2021/0281395 A1* | 9/2021 | Narayanaswami | H04L 9/3247 |

FOREIGN PATENT DOCUMENTS

| | | |
|---|---|---|
| CN | 105427193 | 3/2016 |
| CN | 107798108 | 3/2018 |
| CN | 108462750 A | 8/2018 |
| CN | 109471863 A | 3/2019 |
| CN | 110262901 | 9/2019 |
| CN | 111581049 | 8/2020 |
| KR | 20150011087 A | 1/2015 |
| WO | 2015196885 | 12/2015 |

OTHER PUBLICATIONS

WIPO, International Search Report for PCT/CN2020/117472, Jan. 11, 2021.

* cited by examiner

METHOD FOR MONITORING RUNNING STATE OF DISTRIBUTED SYSTEM, DEVICE, AND STORAGE MEDIUM

CROSS-REFERENCE TO RELATED APPLICATIONS

This application is a U.S. National Stage Entry of International Application No. PCT/CN2020/117472, filed on Sep. 24, 2020, which claims priority to Chinese Patent Application No. 202010269542.4, filed on Apr. 8, 2020. The entire disclosures of the above-identified applications are incorporated herein by reference.

TECHNICAL FIELD

The disclosure relates to a field of computer technology, especially to a field of Internet technology, in particular to a method and apparatus for monitoring a running state of a distributed system, a device and a storage medium.

BACKGROUND

With the continuous development of computer and Internet technologies, most of today's Internet services are realized by distributed service systems. The distributed system includes multiple service subsystems (or referred to as components, modules, or sub servers) deployed on different servers. A business process often needs to be completed by multiple service calls among multiple service subsystems.

With the increasing scale of the distributed system, a storage space occupied by calling data of the distributed system is also increasing. How to reduce the storage space occupied by the calling data of the distributed system is of great significance to reduce a storage cost of the distributed system.

SUMMARY

Embodiments of the disclosure provide a method for monitoring a running state of a distributed system, an apparatus for monitoring a running state of a distributed system, a device and a storage medium.

According to a first aspect, a method for monitoring a running state of a distributed system is provided. The method includes: obtaining a first calling key-value pair sent by a first module in a distributed system, in which the first calling key-value pair includes a first key code value and a first keyword value, the first key code value is configured to uniquely represent a first calling associated with the first module, and the first keyword value is configured to represent total calling data of the first calling; and determining a current running state of the first module according to the first keyword value and historical calling data corresponding to the first key code value in a preset database.

According to a second aspect, an electronic device is provided. The electronic device includes: at least one processor and a memory communicatively coupled to the at least one processor. The memory stores instructions executable by the at least one processor, and when the instructions are executed by the at least one processor, the at least one processor is enabled to execute the method according to the first aspect of the disclosure.

According to a third aspect, a non-transitory computer-readable storage medium storing computer instructions is provided. The computer instructions are configured to cause a computer to execute the method according to the first aspect of the disclosure.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which.

DETAILED DESCRIPTION

Figure 1:
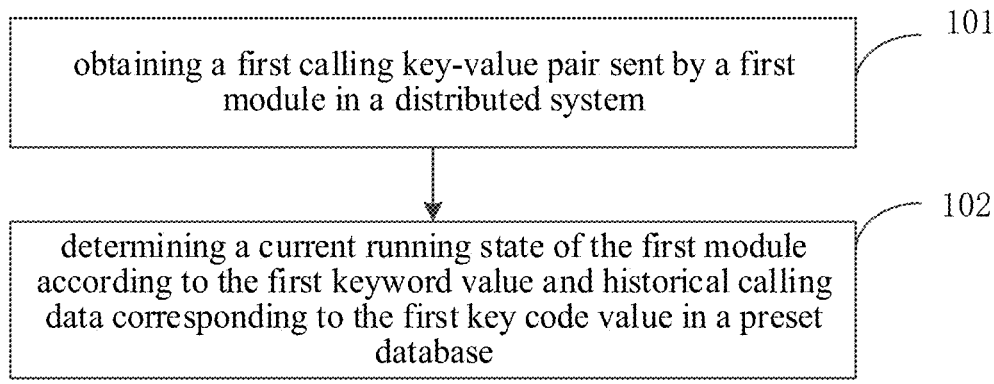
FIG. 1 is a flowchart of a method for monitoring a running state of a distributed system according to a first embodiment of the disclosure.

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

It can be understood that for the existing remote procedure calling of a distributed system, the current calling information will be saved every time the calling is executed. For example, after module A calls module C through module B, a global tracking identifier (ID) of the calling, a link ID of module B calling module C, a link ID of module A calling module B, a relationship between the link of module A calling module B and the link of module B calling module C (for example, the link of module A calling module B is a parent link of the link of module B calling module C), and a consumed time of each calling are saved. For another example, after module A calls module D through module B, a global link ID of the calling, the link ID of module A calling module B, a link ID of module B calling module D, a relationship between the link of module A calling module B and the link of module B calling module D, and a consumed time of each calling are also saved. With the increasing scale of the distributed system, a storage cost of this method is growing.

In order to reduce the storage cost of the distributed system, the disclosure provides a method for monitoring a running state of a distributed system. Firstly, a first calling key-value pair sent by a first module in a distributed system is obtained, in which the first calling key-value pair includes a first key code value and a first keyword value, the first key code value is configured to uniquely represent a first calling associated with the first module, and the first keyword value is configured to represent total calling data of the first calling. A current running state of the first module is determined according to the first keyword value and historical calling data corresponding to the first key code value in a preset database. In this way, the calling data in the distributed system is aggregated and stored according to the key code value, thus a storage space occupied by the calling data in the distributed system is reduced, a storage cost of the distributed system is reduced, and the running state of each module in the entire distributed system is monitored by using the aggregated data.

A method for monitoring a running state of a distributed system, an apparatus for monitoring a running state of a distributed system, an electronic device and a non-transitory computer-readable storage medium are described as follows in combination with the accompanying drawings.

Firstly, a method for monitoring a running state of a distributed system of the disclosure is described in combination with the accompanying drawings.

FIG. 1 is a flowchart of a method for monitoring a running state of a distributed system according to a first embodiment of the disclosure.

As illustrated in FIG. 1, the method for monitoring a running state of a distributed system includes the following steps.

In step 101, a first calling key-value pair sent by a first module in a distributed system is obtained.

The first calling key-value pair includes a first key code value and a first keyword value.

In detail, the method for monitoring a running state of a distributed system of the disclosure can be implemented by the apparatus for monitoring a running state of a distributed system of the disclosure, hereinafter referred to as monitoring apparatus, which can be configured in an electronic device to monitor a running state of a distributed system. The electronic device can be a computer, or a server, which is not limited in the disclosure.

It can be understood that in the distributed system, the calling data will be generated after each calling operation. For example, module A calls module B, and the corresponding calling method is method a, which consumes 1 millisecond (ms). In the disclosure, the calling data generated after each module performs the calling operation can be stored by means of a calling key-value pair and sent to the monitoring apparatus.

The key code value in the calling key-value pair is configured to aggregate and store all calling data with the key code value. The keyword value corresponding to the key code value in the calling key-value pair represents the total calling data after implementing aggregating with the key code value. The first key code value included in the first calling key-value pair is configured to uniquely represent the first calling associated with the first module, so that all the first callings associated with the first module in the calling data can be aggregated and stored with the first key code value. The first keyword value is configured to represent the total calling data of the first calling, which can include a total consumed time of the first calling associated with the first module, a total number of times the first calling associated with the first module has been executed, a consumed time of the first module executing the first calling each time, and so on. The first calling is any one of all callings associated with the first module.

For example, if module A calls module B for n times through method a, which consumes T1 in total, and module A calls module B for m times through method b, which consumes T2 in total, the calling key-value pairs X and Y can be stored. The key code value in the calling key-value pair X is configured to uniquely represent the calling of module B by module A through method a, which can include data such as, ID "A" of module A, ID "a" of method a, a link ID of module A calling module B. The keyword value in the calling key-value pair X is configured to represent the total calling data of module A calling module B through method a, which can include n and T1. The key code value in the calling key-value pair Y is configured to uniquely represent the calling of module B by module A through method b, which can include data such as, ID "A" of module A, ID "b" of method b, the link ID of module A calling module B. The keyword value in the calling key-value pair Y is configured to represent the total calling data of module A calling module B through method b, which can include m and T2.

It can be understood that respective modules in the distributed system can store the corresponding calling data in the form of calling key-value pairs after each calling operation, and send the calling key-value pairs to the monitoring apparatus, so that the monitoring apparatus can obtain the calling key-value pairs sent by respective modules.

In step 102, a current running state of the first module is determined according to the first keyword value and historical calling data corresponding to the first key code value in a preset database.

The current running state of the first module can be represented by a variety of indicators, such as the number of times the first module normally executes the first calling, a query per second (QPS), an average consumed time, and so on. By determining the running state of each module, it is further determined whether the running state of the entire distributed system is abnormal and whether the performance of the distributed system is good or bad.

In the disclosure, a database can be preset. After the monitoring apparatus obtains the calling key-value pair sent by a module, it can store the calling key-value pair in the preset database. That is, the preset database stores all the calling key-value pairs previously sent by respective modules, so that after the monitoring apparatus obtains the first calling key-value pair currently sent by the first module, the current running state of the first module can be determined according to the first key code value in the first calling key-value pair and historical calling data corresponding to the first key code value stored in the preset database.

For example, suppose that module A has called module B for n times through method a, which consumes a total time of T1, that is, the preset database has stored the calling key-value sent by module A previously, in which the key code value in the calling key-value pair is configured to uniquely represent the calling process of module A calling module B through method a, which can include data such as, ID "A" of module A, ID "a" of method a, the link ID of module A calling module B, and the keyword value includes n and T1. Currently, module A calls module B through method a again, which consumes a total time of t, that is, module A sends the calling key-value pair to the monitoring apparatus again. The key code value in the calling key-value pair includes ID "A" of module A, ID "a" of method a, and the link ID of module A calling module B, and the keyword value includes n+1 and T1+t. According to n+1 and T1+t, and n and T1 stored in the preset database, the monitoring apparatus can determine the average consumed time (T1+t)/(n+1) of the calling process that module A calls module B through method a for n+1 times, and the QPS n/T1 of module A within a time period of T1, and other indicators, so as to determine the current running state of the first module.

In this disclosure, by storing the calling data in the form of calling key-value pairs, the calling data of each module can be aggregated according to the same key code value, and the same key code value can be used to only store the aggregated calling data. In this way, a storage space occupied by the calling data in the distributed system can be greatly reduced, and a storage cost of the distributed system can be reduced. In addition, since the disclosure aggregates the calling data of all modules with the key code value corresponding to each calling executed by each module, the current running state of each module can be determined by using the calling key-value pairs currently sent by respective modules and the historical calling data stored in the preset database, so as to monitor the running state of each module in the entire distributed system by using the aggregated data.

According to the method for monitoring a running state of a distributed system of the disclosure, the first calling key-value pair sent by the first module in the distributed system is obtained, the first calling key-value pair includes a first key code value and a first keyword value, the first key code value is configured to uniquely represent a first calling associated with the first module, and the first keyword value is configured to represent total calling data of the first calling. The current running state of the first module is determined according to the first keyword value and historical calling data corresponding to the first key code value in a preset database. In this way, the calling data in the distributed system is aggregated and stored according to the key code value, which reduces a storage space occupied by the calling data of the distributed system and reduces a storage cost of the distributed system.

It can be seen from the above analysis that in the disclosure, the current running state of the first module can be determined according to the first keyword value and the historical calling data corresponding to the first key code value in the preset database, and the current running state of the first module can be represented by the QPS, the average consumed time and other indicators. The method of determining the QPS, the average consumed time of the first module in the method for monitoring a running state of a distributed system of the disclosure is described as follows in combination with FIG. 2.

Figure 2:
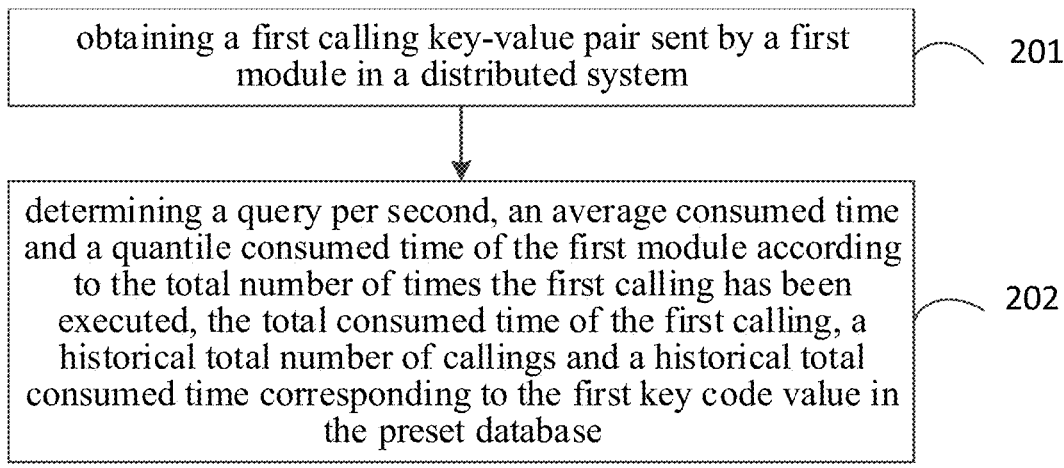
FIG. 2 is a flowchart of a method for monitoring a running state of a distributed system according to a second embodiment of the disclosure.

FIG. 2 is a flowchart of a method for monitoring a running state of a distributed system according to a second embodiment of the disclosure.

As illustrated in FIG. 2, the distributed system running state monitoring method includes the following steps.

In step 201, a first calling key-value pair sent by a first module in a distributed system is obtained.

The first calling key-value pair includes a first key code value and a first keyword value.

It can be understood that in the distributed system, the calling data will be generated after each calling operation. For example, module A calls module B, and the corresponding calling method is method a, which consumes 1 ms. In the disclosure, the calling data generated after each module performs the calling operation can be stored by means of a calling key-value pair and sent to the monitoring apparatus.

The key code value in the calling key-value pair is configured to aggregate and store all calling data with the key code value. The keyword value corresponding to the key code value in the calling key-value pair represents the total calling data after implementing aggregating with the key code value.

The first key code value included in the first calling key-value pair is configured to uniquely represent the first calling associated with the first module, so that all the first callings associated with the first module in the calling data can be aggregated and stored with the first key code value. In the embodiment of the disclosure, the key code value of the first calling key-value pair may include an ID of the first module, a calling method name, a current first link ID (i.e. Spanid) and a corresponding first parent link ID (i.e. Parentid).

The ID of the first module is configured to uniquely identify the first module, which can be set as required.

The calling method name is configured to identify a corresponding calling method when a module executes a calling. The calling method name included in the first key code value is configured to identify the corresponding calling method name when the first module executes this first calling.

Figure 3:
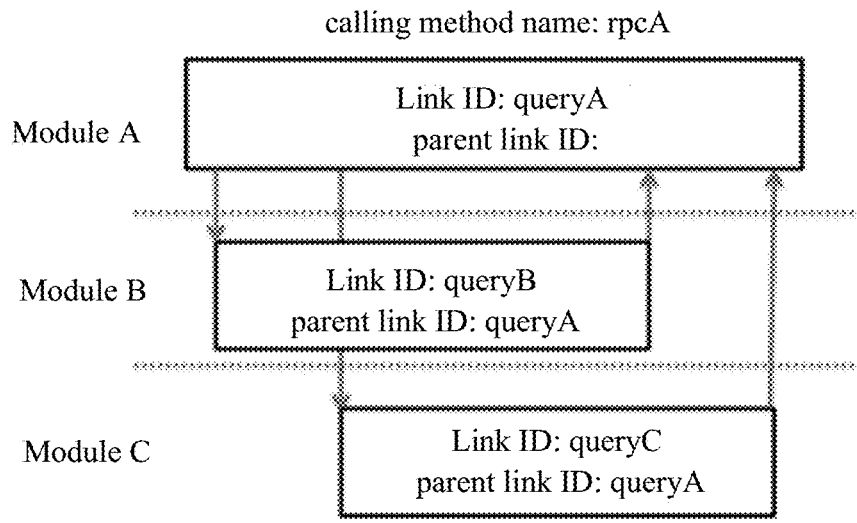
FIG. 3 is a diagram of a method for monitoring a running state of a distributed system according to a second embodiment of the disclosure.

For example, taking a link of module A calling module C through module B as shown in FIG. 3 as an example, suppose that the calling method name is rpcA, the link ID of module A calling module B is queryA, the link ID of module B calling module C is queryB, and the link ID of module C calling other modules (not shown in FIG. 3) is queryC, that is, queryA is a parent link of queryB, then the key code value in the calling key-value pair sent by module B to the monitoring apparatus can include: the ID "A" of module A, the calling method name: rpcA, the link ID: queryB, and the parent link ID: queryA.

The first keyword value is configured to represent the total calling data of the first calling, which can include the total consumed time of the first calling associated with the first module, the total number of times the first calling has been executed, and so on.

The total number of times the first calling has been executed is a sum of the total number of times the first calling has been executed by the first module before the first calling of this time is executed and 1. The total consumed time of the first calling is a sum of the total consumed time of executing the first calling by the first module before the first calling of this time is executed and the total consumed time of executing the first calling of this time.

For example, module A has called module B for n times through method a, with the total consumed time of T1. At this time, module A calls module B through method a again, which consumes t1, then in the calling key-value pair sent by module A, the key code value can include ID "A" of module A, ID "a" of method a, the link ID of module A calling module B, and the keyword value can include n+1, T1+t1.

It can be understood that respective modules in the distributed system can store the corresponding calling data in the form of calling key-value pairs after each calling operation, and send the calling key-value pairs to the monitoring apparatus, so that the monitoring apparatus can obtain the calling key-value pairs sent by respective modules.

In step 202, a QPS, an average consumed time and a quantile consumed time of the first module are determined according to the total number of times the first calling has been executed, the total consumed time of the first calling, a historical total number of callings and a historical total consumed time corresponding to the first key code value in the preset database.

It can be understood that the QPS, the average consumed time and the quantile consumed time are important indicators to determine whether the running state of the entire distributed system is abnormal and whether the performance of the distributed system is good or bad.

In the disclosure, a database can be preset. After the monitoring apparatus obtains the calling key-value pair sent by a module, it can store the calling key-value pair in the preset database. That is, the preset database stores all the calling key-value pairs previously sent by respective modules, so that after the monitoring respective obtains the first calling key-value pair currently sent by the first module, according to the first key code value in the first calling key-value pair, it is queried in the preset database whether it contains the historical total number of callings and historical total consumed time corresponding to the first key code value, if yes, it means that the first module has previously executed the first calling, so that the monitoring apparatus can determine the QPS, the average consumed time and the quantile consumed time of the first module according to the total number of times the first calling has been executed and the total consumed time of the first calling included in the first keyword value, the historical total number of callings and the historical total consumed time corresponding to the first key code value stored in the preset database.

The QPS of the first module can be the query per second of the first module within a preset time period, and the preset time period can be set as required.

For example, suppose that in the first calling key-value pair sent by the first module, the first keyword value includes the total number of times N the first calling has been executed and the total consumed time T of the first calling. In the preset database, the historical total time of callings corresponding to the first key code value is N', and the historical total consumed time corresponding to the first key code value is T'. The QPS of the first module can be the QPS of the first module within a time period of T. In this case, the QPS=N/T. Alternatively, the QPS of the first module can be the QPS of the first module within the total consumed time (i.e. T−T') of executing the first calling of this time. In this case, the QPS=(N−N')/(T−T').

The average consumed time of the first module can be the time consumed by each calling when the first module executes the preset number of callings. The preset number can be set as required.

For example, suppose that in the first calling key-value pair sent by the first module, the first keyword value includes the total number of times N the first calling has been executed and the total consumed time T of the first calling. In the preset database, the historical total consumed time corresponding to the first key code value is N', and the historical total consumed time corresponding to the first key code value is T'. The average consumed time of the first module can be the time consumed by each calling of N times of first callings executed by the first module. In this case, the average consumed time=T/N. Alternatively, the average consumed time of the first module can be the average consumed time of first N' times of first callings executed by the first module. In this case, the average consumed time=T'/N'.

It can be understood that in the disclosure, the keyword value not only includes the total number of times N that a calling has been executed and the total consumed time T, but also is used to perform bucketing on the consumed time. A length of the bucket can be set as needed, for example, 0-50 ms are classified to bucket 0, 50-100 ms are classified to bucket 1, 100-150 ms are classified to bucket 2, until 950-1000 ms are classified to bucket 19. Bucket 0 stores the sum of the consumed time of all callings that consume 0-50 ms, bucket 1 stores the sum of the consumed time of all callings that consume 50-100 ms, and bucket 19 stores the sum of the consumed time of all callings that consume 950-1000 ms.

Then, in an embodiment, the quantile consumed time $P_m$ of the first module can be determined according to the following formula:

$$P_m = L + \frac{\frac{m}{100}N - F_b}{f}i$$

where m represents a quantile value. For example, when determining the consumed time of 95 quantile, m=95; N is the sum of the numbers of times of first callings of all buckets, that is, the total number of times the first calling has been executed included in the first keyword value; L is the left interval of the bucket where the first calling of the m quantile is located; Fb represents the number of times of first callings stored in a bucket smaller than L; f is the number of times of first callings stored in the bucket where m is located; and i is the length of each bucket, such as 50 in the above example.

For example, based on the above example, the consumed time of the first callings with highest 5% of consumed time, that is, the consumed time of 95 quantile is determined. If the sum of the numbers of times of first callings of all buckets is 92, the bucket where the first calling of 95 quantile is located is bucket 19, the left interval of bucket 19 is 950 ms, the number of times of first callings with the consumed time within 0-950 ms is 90, the number of times of first callings stored in bucket 19 is 2, and the length of each bucket is 50, then the consumed time of 95 quantile is $$P_{95} = 950 + \frac{\frac{95}{100}*92 - 90}{2}*50 = 885 \text{ms}.$$

It should be noted that the above QPS, the average consumed time, and the quantile consumed time of the first module are only illustrative. In practical applications, other indicators that can represent the current running state of the first module can also be determined according to the total number of times the first calling has been executed, the total consumed time of the first calling, the historical total number of callings, and the historical total consumed time, which is not limited in the disclosure.

It should be noted that after the monitoring apparatus obtains the calling key-value pair sent by a module, if it is determined that the preset database contains the historical calling data corresponding to the key code value included in the calling key-value pair, the historical calling data corresponding to the key code value included in the preset database is updated to the total number of times that the calling associated with the module has been executed and the total consumed time included in the keyword value of the calling key-value pair sent by the module. That is, the historical total number of callings and the historical total consumed time corresponding to the first key code value contained in the preset database, are the total number of times the first calling has been executed and the total consumed time of the first calling included in the keyword value corresponding to the first key code value lately sent by the first module.

It can be understood that in the disclosure, by including the ID of the first module, the calling method name, the current first link ID and the corresponding first parent link ID in the first key code value of the first calling key-value pair, and including the total number of times the first calling has been executed and the total consumed time in the first keyword value, the first calling key-value pair contains all the calling data of the first module and the parent-child relationship between the related calling links of the first module. According to the above information in the key-value pair, the data used to represent the running state of the first module, such as the QPS, the average consumed time and the quantile consumed time of the first module, can be determined to realize the monitoring of the running state of the first module in the entire distributed system.

By storing the calling data in the form of the calling key-value pairs, the calling data of each module can be aggregated according to the same key code value, and the same key code value can be used to only store the aggregated calling data. Therefore, a storage space of the calling data in the distributed system can be greatly reduced, and a storage cost of the distributed system can be reduced. In the disclosure, data such as the QPS, the average consumed time and the quantile consumed time of the first module can be determined by using the calling key-value pair currently sent by the first module and the historical total number of callings and the historical total consumed time corresponding to the first key code value stored in the preset database, so as to realize the monitoring of the running state of the first module by using the aggregated data. By monitoring the running state of each module in the same way, it can monitor the running state of each module in the entire distributed system with the aggregated data.

According to the method for monitoring a running state of a distributed system of the disclosure, the first calling key-value pair sent by the first module in the distributed system is obtained, and then the QPS, the average consumed time and the quantile consumed time of the first module can be determined according to the total number of times the first calling has been executed, the total consumed time of the first calling, and the historical total number of callings and the historical total consumed time corresponding to the first key code value in the preset database. In this way, the calling data in the distributed system is aggregated and stored according to the key code value, thus a storage space occupied by the calling data in the distributed system is reduced, a storage cost of the distributed system is reduced, and the running state of each module in the entire distributed system is monitored by using the aggregated data.

According to the above analysis, when the preset database contains the historical data corresponding to the first key code value, the current running state of the first module can be determined according to the first keyword value and the historical calling data corresponding to the first key code value in the preset database. In a possible implementation, the preset database may not contain the historical calling data corresponding to the first key code value, in view of the above situation, the method for monitoring a running state of a distributed system of the disclosure is further described in combination with FIG. 4.

Figure 4:
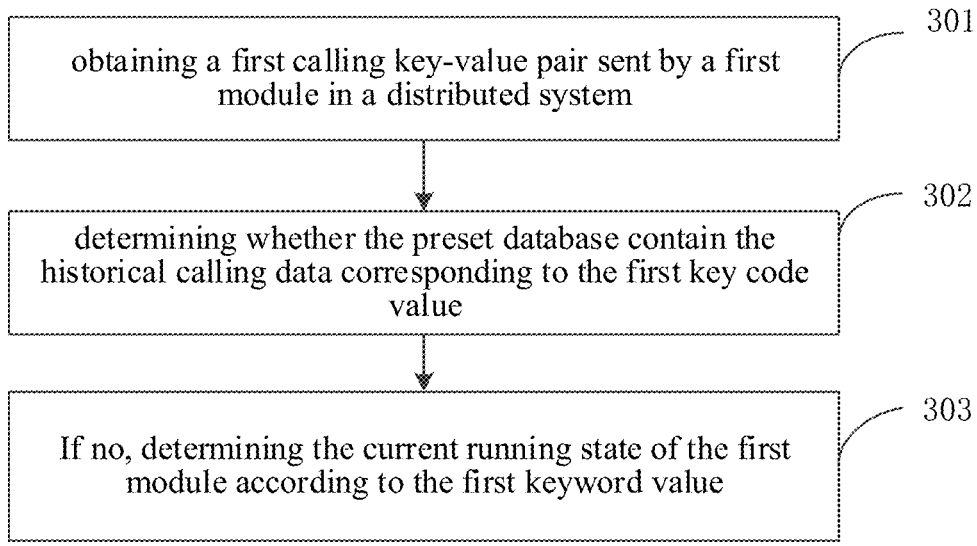
FIG. 4 is a flowchart of a method for monitoring a running state of a distributed system according to a third embodiment of the disclosure.

FIG. 4 is a flowchart of a method for monitoring a running state of a distributed system according to a third embodiment of the disclosure.

As illustrated in FIG. 4, the method for monitoring a running state of a distributed system of the disclosure includes the followings.

In step 301, a first calling key-value pair sent by a first module in a distributed system is obtained.

The first calling key-value pair includes a first key code value and a first keyword value, the first key code value is configured to uniquely represent a first calling associated with the first module, and the first keyword value is configured to represent total calling data of the first calling.

The first keyword value includes a total number of times the first calling has been executed and a total consumed time of the first calling.

The specific implementation process and principle of the above step 301 can refer to the relevant description of the above embodiment, which will not be repeated here.

It should be noted that the method for monitoring a running state of a distributed system in this embodiment is also applicable to the case where the first key code value includes an ID of the first module, a calling method name, a current first link ID and a corresponding first parent link ID, which is not limited in this disclosure.

In step 302, it is determined whether a preset database contains historical calling data corresponding to the first key code value.

The historical calling data corresponding to the first key code value can include a historical total number of callings and a historical total consumed time corresponding to the first key code value, the time consumed by each execution of the first calling and other data. The embodiment of the disclosure takes the historical calling data corresponding to the first key code value including the historical total number of callings and the historical total consumed time corresponding to the first key code value as an example.

In step 303, if no, the current running state of the first module is determined according to the first keyword value.

It can be understood that when the preset database does not contain the historical calling data corresponding to the first key code value, it means that the first module has not executed the first calling previously. In this case, the total number of times the first calling has been executed included in the first keyword value is 1, and the historical total consumed time is the total consumed time that the first module executes the first calling of this time.

In the disclosure, when the preset database does not contain the historical calling data corresponding to the first key code value, the current running state of the first module can be determined according to the first keyword value corresponding to the first key code value in the first calling key-value pair sent by the first module.

The current running state of the first module can be represented by indicators such as a QPS, an average consumed time and a quantile consumed time of the first module.

It should be noted that since the first module has not executed the first calling before, the QPS of the first module here can be the QPS of the first module within the total consumed time of executing the first calling of this time. The average consumed time can be the time consumed by the first module executing the first calling of this time.

In this way, when the first module executes the first calling for the first time, the current running state of the first module can be determined according to the calling key-value pair sent by the first module. That is, through the method of the disclosure, when each module executes the calling for the first time, the running state of each module in the entire distributed system can be monitored according to the calling key-value pair sent by each module.

It is understandable that after the monitoring apparatus obtains the calling key-value pair sent by the first module in the distributed system, the historical total number of callings and the historical total consumed time corresponding to the first key code value in the preset database are updated to the total number of times the first calling has been executed and the total consumed time of the first calling included in the first keyword value in the first calling key-value pair sent by the first module.

In addition, in order to facilitate users to understand more running state data of the distributed system, the preset database can also store the current running state of each module, such as the QPS, the average consumed time and the quantile consumed time.

After step 303, the method further includes: updating a second keyword value corresponding to the first key code value in the preset database according to the first keyword value and the current running state of the first module.

That is, the second keyword value corresponding to the first key code value in the preset database can not only include the total number of times the first calling has been executed and the total consumed time of the first calling included in the first keyword value in the first calling key-value pair sent by the first module, but also include the current running state of the first module determined according to the first keyword value, the historical calling data in the preset database, or according to the first keyword value.

By using the first keyword value and the current running state of the first module to update the second keyword value corresponding to the first key code value in the preset database, the second keyword value corresponding to the first key code value in the preset database can include the total number of times the first calling has been executed and the total consumed time of the first calling, as well as data such as the QPS, the average consumed time and the quantile consumed time of the first module used to represent the current running state of the first module. The data included in the preset database is synchronized with the calling data generated by the operation of the distributed system, so that when the link tracking of the distributed system is carried out, all the data obtained from the database are the latest data.

According to the method for monitoring a running state of a distributed system of the disclosure, after the first calling key-value pair sent by the first module in the distributed system is obtained, it is determined whether the preset database contains the historical calling data corresponding to the first key code value, if no, the current running state of the first module is determined according to the first keyword value. Therefore, the calling data in the distributed system is aggregated and stored according to the key code value, thus a storage space occupied by the calling data in the distributed system is reduced, a storage cost of the distributed system is reduced, and the running state of each module in the entire distributed system is monitored by using the aggregated data.

It can be seen from the above analysis that each module can send the generated calling key-value to the monitoring apparatus after each calling. In the disclosure, after obtaining the calling key-value pair sent by each module, a topology map for representing a current relationship between each module can also be generated according to each calling key-value pair and displayed. In view of the above situation, combined with FIG. 5, the method for monitoring a running state of a distributed system of the disclosure is further described.

Figure 5:
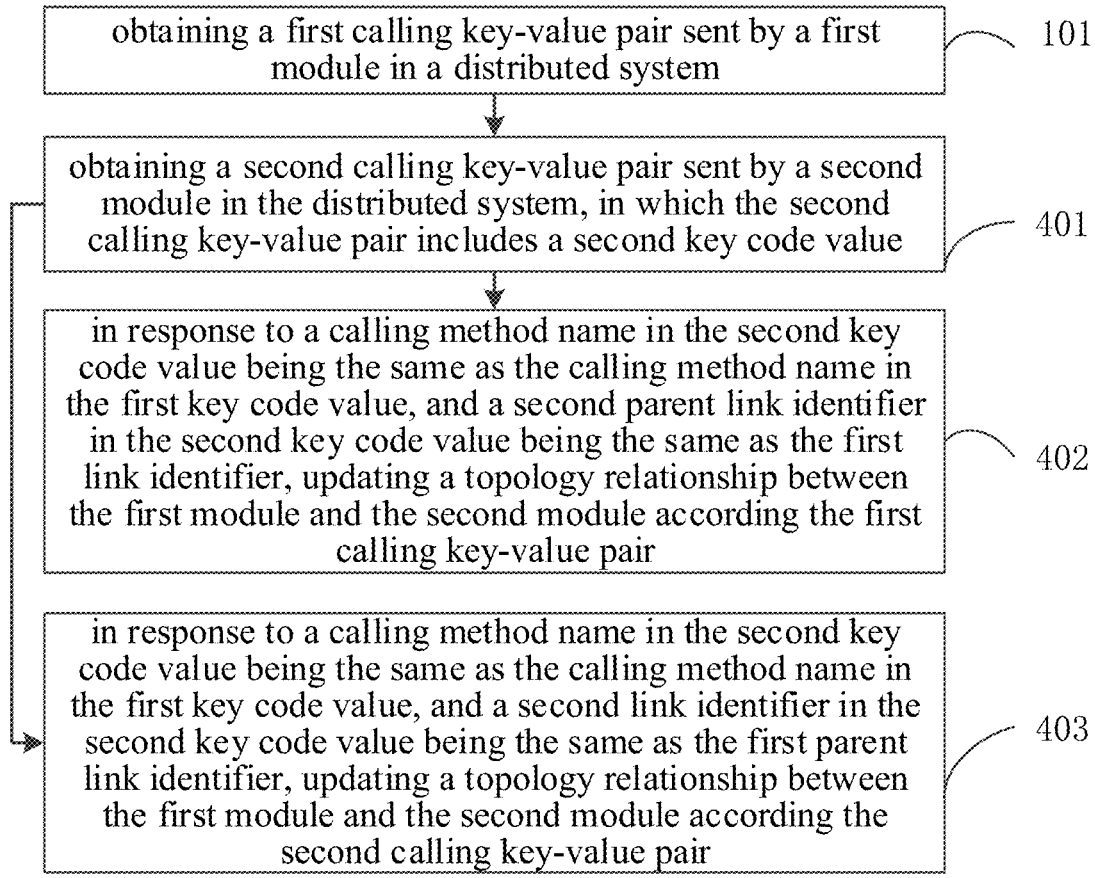
FIG. 5 is a flowchart of a method for monitoring a running state of a distributed system according to a fourth embodiment of the disclosure.

FIG. 5 is a flowchart of a method for monitoring a running state of a distributed system according to a fourth embodiment of the disclosure.

As illustrated in FIG. 5, the method for monitoring a running state of a distributed system includes the followings.

In step 101, a first calling key-value pair sent by a first module in a distributed system is obtained.

The first calling key-value pair includes a first key code value and a first keyword value. The first key code value is configured to uniquely represent a first calling associated with the first module, and the first keyword value is configured to represent total calling data of the first calling.

The first key value may include an ID of the first module, a calling method name, a current first link ID and a corresponding first parent link ID. The first keyword value may include the total number of times the first calling has been executed and the total consumed time of the first calling.

After step 101, the method further includes the followings.

In step 401, a second calling key-value pair sent by a second module in the distributed system is obtained, in which the second calling key-value pair includes a second key code value.

The second key code value is configured to uniquely represent a second calling associated with the second module, and the second keyword value is configured to represent total calling data of the second calling.

The second key code value may include an ID of the second module, a calling method name, a current second link ID and a corresponding second parent link ID. The ID of the second module is configured to uniquely identify the second module, and the calling method name included in the second key code value is configured to identify the corresponding calling method name when the second module executes this calling.

It should be noted that the foregoing description of the first calling key-value pair sent by the first module is also applicable to the second calling key-value pair sent by the second module in the embodiment of the disclosure, which will not be repeated here.

In step 402, in response to the calling method name in the second key code value being the same as the calling method name in the first key code value, and the second parent link ID in the second key code value being the same as the first link ID, a topology relationship between the first module and the second module is updated according the first calling key-value pair.

In step 403, in response to the calling method name in the second key code value being the same as the calling method name in the first key code value, and the second link ID in the second key code value being the same as the first parent link ID, a topology relationship between the first module and the second module is updated according the second calling key-value pair.

It can be understood that each module can send the generated calling key value to the monitoring apparatus after each calling. In the disclosure, after obtaining the calling key-value pair sent by each module, a topology map for representing the current relationship between each module can also be generated according to each calling key-value pair and displayed.

Each node in the topology map represents each module, and the edge between the nodes represents the key code value in the calling key-value pair corresponding to one module.

It should be noted that for two modules A and B, when the calling method name in the key code value of the calling key-value pair sent by module A is the same as the calling method name in the key code value of the calling key-value pair sent by module B, and the link ID in the key code value in the calling key-value pair sent by module A is the same as the parent link ID in the key code value in the calling key-value pair sent by module B, that is, when calling module B through module A, the edge between modules A and B represents the key code value in the calling key-value pair sent by module A.

Then, in the embodiment of the disclosure, if the calling method name in the second key code value is the same as the method name in the first key code value, and the second parent link ID in the second key code value is the same as the first link ID, that is, when the first module calls the second module, the first calling key-value pair is used to update the topology relationship between the first module and the second module. If the calling method name in the second key code value is the same as the method name in the first key code value, and the second link ID in the second key code value is the same as the first parent link ID, that is, when the second module calls the first module, the topological relationship between the first module and the second module is updated by using the second calling key-value pair.

By obtaining the calling key-value pairs of multiple modules, a topology map is generated according to each calling key-value pair, so that users can intuitively understand the running state of the distributed system, and the topology relationship between the first module and the second module is updated according to the calling key-value pairs sent in real time when the first module and the second module execute the callings respectively, so that the data in the topology map is synchronized with the calling data generated by the operation of the distributed system, and when the link tracking of the distributed system is carried out, the data obtained according to the topology map is the latest data.

In addition, in the topology map, the data included in the keyword value corresponding to the key code value represented by the edge between modules can be displayed on a display interface in a preset manner when the user clicks the edge between modules. The preset manner can include a display position, a font size, and a display order of the data included in the keyword value. The keyword value corresponding to the key code value can be the keyword value corresponding to the key code value obtained from the preset database after querying by the monitoring apparatus the preset database according to the key code value corresponding to the edge selected by the user.

Figure 6:
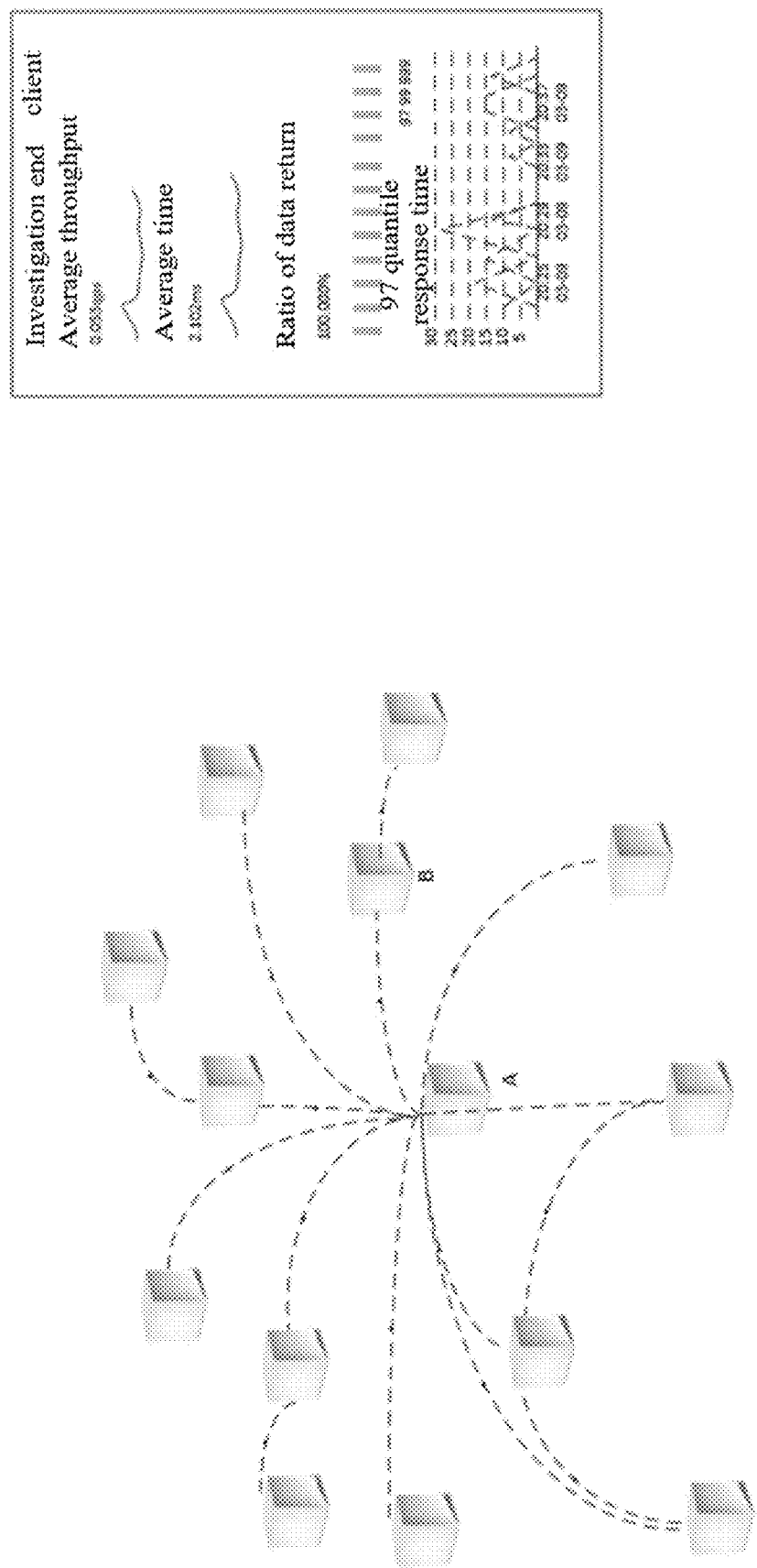
FIG. 6 is a topology example diagram according to a fourth embodiment of the disclosure.

For example, as shown in FIG. 6, the edge between module A and module B represents the key code value in the calling key-value pair sent by module A. When the user clicks the edge between module A and module B, the monitoring device can query the preset database according to the key code value corresponding to the edge, to obtain the keyword value corresponding to the key code value. As illustrated in FIG. 6, on the right side of the topology map, the data included in the keyword value corresponding to the key code value in the calling key-value pair sent by module A is displayed, such as average throughput, average consumed time, ratio of data return, and quantile consumed time, so that the user can intuitively understand the running state of the distributed system.

It should be noted that when implementing different services, one module may use different calling methods to call another module. In the topology map of the disclosure, multiple edges can be included between the same two modules, and the calling methods in the key values represented by different edges are different. In this disclosure, when the calling method names in the key code values of the calling key-value pairs sent by modules A and B are the same, and the link ID of module A is the same as the parent link ID of module B, the topology relationship between module A and module B is updated according to the calling key-value pair sent by module A.

According to the method for monitoring a running state of a distributed system of the disclosure, after obtaining the first calling key-value pair sent by the first module in the distributed system, the second calling key-value pair sent by the second module in the distributed system is obtained. The second calling key-value pair includes the second key code value. In response to the calling method name in the second key code value being the same as the calling method name in the first key code value, and the second parent link ID in the second key code value being the same as the first link ID, a topology relationship between the first module and the second module is updated according the first calling key-value pair. In response to a calling method name in the second key code value being the same as the calling method name in the first key code value, and the second link ID in the second key code value being the same as the first parent link ID, the topology relationship between the first module and the second module is updated according the second calling key-value pair. Thus, the topology map used to represent the current relationship between modules is generated according to the calling key-value pair sent by each module, and the topology map is updated according to the calling key value sent by each module, so that users can intuitively understand the running state of the distributed system.

The apparatus for monitoring a running state of a distributed system is described below in combination with FIG. 7.

Figure 7:
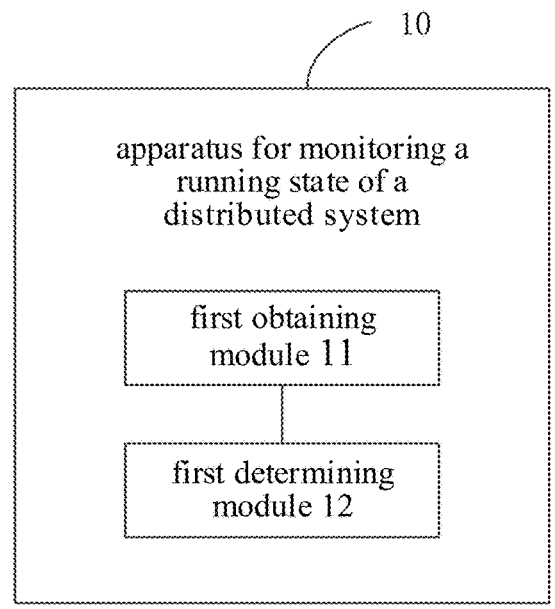
FIG. 7 is a block diagram of an apparatus for monitoring a running state of a distributed system according to a fifth embodiment of the disclosure.

FIG. 7 is a block diagram of an apparatus for monitoring a running state of a distributed system according to a fifth embodiment of the disclosure.

As illustrated in FIG. 7, the apparatus 10 for monitoring a running state of a distributed system according to the disclosure includes: a first obtaining module 11 and a first determining module 12.

The first obtaining module 11 is configured to obtain a first calling key-value pair sent by a first module in a distributed system, in which the first calling key-value pair includes a first key code value and a first keyword value, the first key code value is configured to uniquely represent a first calling associated with the first module, and the first keyword value is configured to represent total calling data of the first calling.

The first determining module 12 is configured to determine a current running state of the first module according to the first keyword value and historical calling data corresponding to the first key code value in a preset database.

In detail, the apparatus for monitoring a running state of a distributed system according to the disclosure hereinafter is referred to as a monitoring apparatus. The monitoring apparatus can execute the method for monitoring a running state of a distributed system according to the disclosure, and the apparatus can be configured in an electronic device to monitor a running state of a distributed system.

The description of the method for monitoring a running state of a distributed system in the above embodiment is also applicable to the apparatus for monitoring a running state of a distributed system in the embodiment of the disclosure, which will not be repeated here.

The apparatus for monitoring a running state of a distributed system according to the disclosure includes: the first obtaining module and the first determining module. The first obtaining module is configured to obtain a first calling key-value pair sent by a first module in a distributed system, in which the first calling key-value pair includes a first key code value and a first keyword value, the first key code value is configured to uniquely represent a first calling associated with the first module, and the first keyword value is configured to represent total calling data of the first calling. The first determining module is configured to determine a current running state of the first module according to the first keyword value and historical calling data corresponding to the first key code value in a preset database. Therefore, the calling data in the distributed system is aggregated and stored according to the key code value, which reduces a storage space occupied by the calling data in the distributed system and reduces a storage cost of the distributed system.

The apparatus for monitoring a running state of a distributed system is further described below in combination with FIG. 8.

Figure 8:
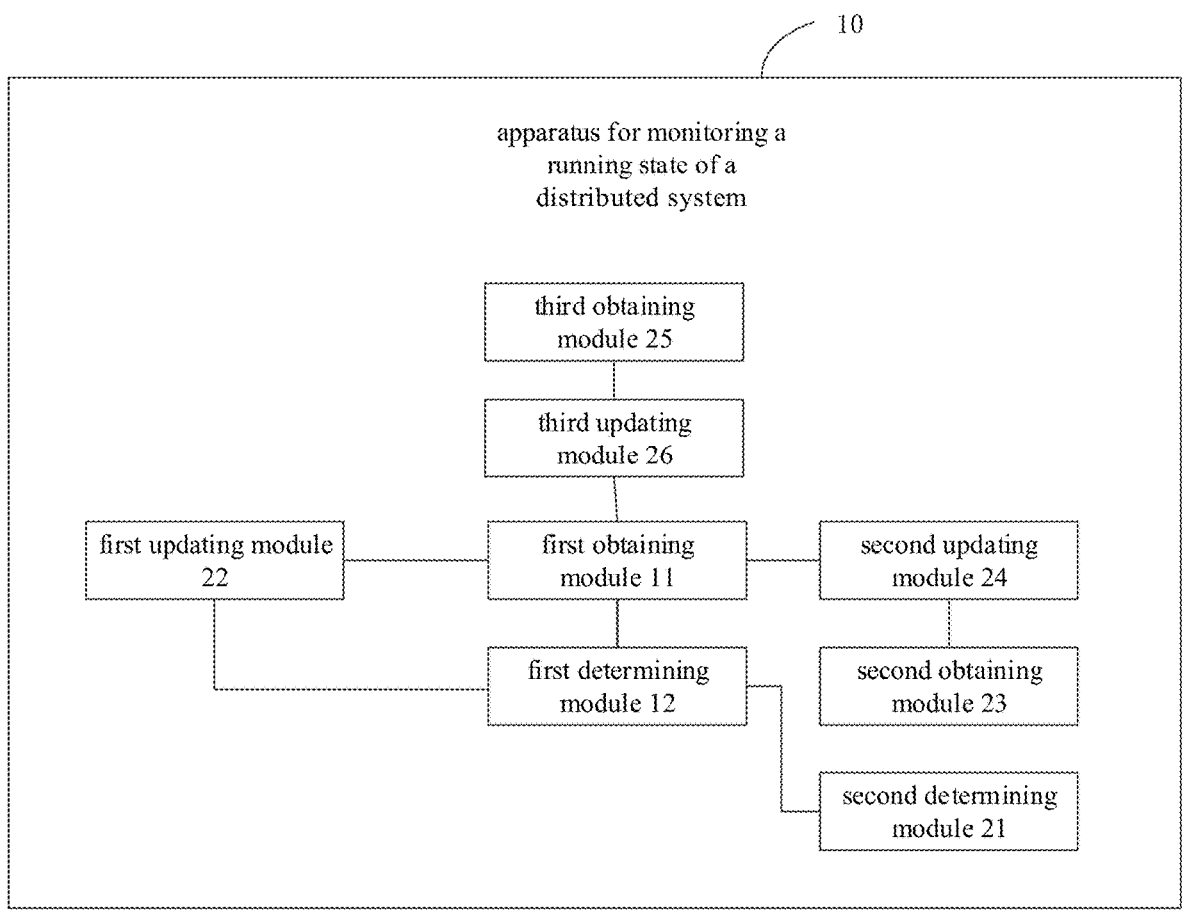
FIG. 8 is a block diagram of an apparatus for monitoring a running state of a distributed system according to a sixth embodiment of the disclosure.

FIG. 8 is a block diagram of an apparatus for monitoring a running state of a distributed system according to a sixth embodiment of the disclosure.

As illustrated in FIG. 8, the apparatus 10 for monitoring a running state of a distributed system of the disclosure includes: a first obtaining module 11, a first determining module 12, a second determining module 21, a first updating module 22, a second obtaining module 23, a second updating module 24, a third obtaining module 25 and a third updating module 26.

The first obtaining module 11 is configured to obtain a first calling key-value pair sent by a first module in a distributed system.

The first calling key-value pair includes a first key code value and a first keyword value. The first keyword value includes a total number of times the first calling has been executed and a total consumed time of the first calling. The first key code value includes an ID of the first module, a calling method name, a current first link ID and a corresponding first parent link ID.

The first determining module 12 is configured to determine a current running state of the first module according to the first keyword value and historical calling data corresponding to the first key code value in a preset database.

The second determining module 21 is configured to, in response to that the preset database does not contain the historical calling data corresponding to the first key code value, determine the current running state of the first module according to the first keyword value.

The first updating module 22 is configured to update a second keyword value corresponding to the first key code value in the preset database according to the first keyword value and the current running state of the first module.

The second obtaining module 23 is configured to obtain a second calling key-value pair sent by a second module in the distributed system, in which the second calling key-value pair includes a second key code value.

The second updating module 24 is configured to, in response to a calling method name in the second key code value being the same as the calling method name in the first key code value, and a second parent link ID in the second key code value being the same as the first link ID, update a topology relationship between the first module and the second module according the first calling key-value pair.

The third obtaining module 25 is configured to obtain a second calling key-value pair sent by a second module in the distributed system, in which the second calling key-value pair includes a second key code value.

The third updating module 26 is configured to, in response to a calling method name in the second key code value being the same as the calling method name in the first key code value, and a second link ID in the second key code value being the same as the first parent link ID, update a topology relationship between the first module and the second module according the second calling key-value pair.

In a possible implementation, the first keyword value includes a total number of times the first calling has been executed and a total consumed time of the first calling. The first determining module is further configured to: determine a query per second, an average consumed time and a quantile consumed time of the first module according to the total number of times the first calling has been executed, the total consumed time of the first calling, a historical total number of callings and a historical total consumed time corresponding to the first key code value in the preset database.

The description of the method for monitoring a running state of a distributed system in the above embodiment is also applicable to the apparatus for monitoring a running state of a distributed system in the embodiment of the disclosure, which will not be repeated here.

With the apparatus for monitoring a running state of a distributed system according to the disclosure, the calling data is aggregated and stored according to the key code value, thus a storage space occupied by the calling data in the distributed system is reduced, a storage cost of the distributed system is reduced, and the running state of each module in the entire distributed system is monitored by using the aggregated data.

According to the embodiments of the disclosure, the disclosure also provides an electronic device and a readable storage medium.

Figure 9:
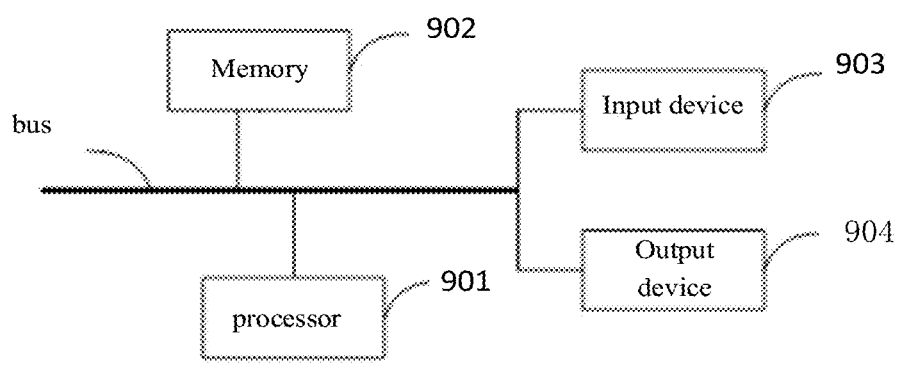
FIG. 9 is a block diagram of an electronic device for implementing a method for monitoring a running state of a distributed system according to the embodiments of the disclosure.

FIG. 9 is a block diagram of an electronic device used to implement the method for monitoring a running state of a distributed system according to the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 9, the electronic device includes: one or more processors 901, a memory 902, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). One processor 901 is taken as an example in FIG. 9.

The memory 902 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 902 is configured to store non-transitory software programs, non-transitory computer-executable programs and modules, such as program instructions/modules corresponding to the method for monitoring a running state of a distributed system according to the embodiments of the disclosure (for example, the first obtaining module 11 and the first determining module 12 shown in FIG. 7). The processor 901 executes various functional applications and data processing of the server by running the non-transitory software programs, instructions, and modules stored in the memory 902, to implement the method in the above method embodiments.

The memory 902 may include a storage program area and a storage data area, where the storage program area may store an operating system and application programs required for at least one function. The storage data area may store data created according to the use of the electronic device for implementing the method. In addition, the memory 902 may include a high-speed random access memory, and a non-transitory memory, such as at least one magnetic disk storage device, a flash memory device, or other non-transitory solid-state storage device. In some embodiments, the memory 902 may optionally include a memory remotely disposed with respect to the processor 901, and these remote memories may be connected to the electronic device for implementing the method through a network. Examples of the above network include, but are not limited to, the Internet, an intranet, a local area network, a mobile communication network, and combinations thereof.

The electronic device for implementing the method for monitoring a running state of a distributed system may further include: an input device 903 and an output device 904. The processor 901, the memory 902, the input device 903 and the output device 904 may be connected by a bus or in other ways, and the connection by a bus is taken as an example in FIG. 9.

The input device 903 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 904 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. That is, the disclosure also provides a computer program, when the computer program is executed by a processor, the method for monitoring a running state of a distributed system described in the above embodiments is implemented. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or a computing system that includes any combination of such background components, intermediate computing components, or front-end components. The components of the system may be interconnected by any form or medium of digital data communication (e.g., a communication network). Examples of communication networks include: a local area network (LAN), a wide area network (WAN), and the Internet.

The computer system may include a client and a server. The client and server are generally remote from each other and interacting through a communication network. The client-server relation is generated by computer programs running on the respective computers and having a client-server relation with each other.

According to the technical solution of the embodiments of the disclosure, the calling data is aggregated and stored according to the key code value, thus a storage space occupied by the calling data in the distributed system is reduced, a storage cost of the distributed system is reduced, and a running state of each module in the entire distributed system is monitored by using the aggregated data.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for monitoring a running state of a distributed system, comprising:
    obtaining, by a monitoring apparatus, a first calling key-value pair sent by a first component in a distributed system, wherein the first calling key-value pair comprises a first key code value and a first keyword value, the first key code value is configured to uniquely represent a first calling associated with the first component, and the first keyword value is configured to represent total calling data of the first calling; and
    determining, by the monitoring apparatus, a current running state of the first component according to the first keyword value and historical calling data corresponding to the first key code value in a preset database,
    wherein the first keyword value comprises a total number of times the first calling has been executed and a total consumed time of the first calling; and
    determining the current running state of the first component according to the first keyword value and the historical calling data corresponding to the first key code value in the preset database, comprises:
        determining a query per second, an average consumed time and a quantile consumed time of the first component according to the total number of times the first calling has been executed, the total consumed time of the first calling, a historical total number of callings and a historical total consumed time corresponding to the first key code value in the preset database.

2. The method of claim 1, wherein after obtaining the first calling key-value pair sent by the first component in the distributed system, the method further comprises:
    in response to that the preset database does not contain the historical calling data corresponding to the first key code value, determining the current running state of the first component according to the first keyword value.

3. The method of claim 2, wherein after determining the current running state of the first component, the method further comprises:
    updating a second keyword value corresponding to the first key code value in the preset database according to the first keyword value and the current running state of the first component.

4. The method of claim 1, wherein after determining the current running state of the first component, the method further comprises:
    updating a second keyword value corresponding to the first key code value in the preset database according to the first keyword value and the current running state of the first component.

5. The method of claim 1, wherein the first key code value comprises an identifier of the first component, a calling method name, a first current link identifier and a first parent link identifier.

6. The method of claim 5, further comprising:
    obtaining a second calling key-value pair sent by a second component in the distributed system, wherein the second calling key-value pair comprises a second key code value, and the second key code value comprises an identifier of the second component, a calling method name, a second current link identifier and a second parent link identifier; and
    in response to the calling method name in the second key code value being the same as the calling method name in the first key code value, the second parent link identifier in the second key code value being the same as the first current link identifier, and the first component calling the second component, updating a topology relationship between the first component and the second component according the first calling key-value pair.

7. The method of claim 5, further comprising:
    obtaining a second calling key-value pair sent by a second component in the distributed system, wherein the second calling key-value pair comprises a second key code value, and the second key code value comprises an identifier of the second component, a calling method name, a second current link identifier and a second parent link identifier; and
    in response to the calling method name in the second key code value being the same as the calling method name in the first key code value, the second current link identifier in the second key code value being the same as the first parent link identifier, and the second component calling the first component, updating a topology relationship between the first component and the second component according the second calling key-value pair.

8. An electronic device, comprising:
    at least one processor;
    a memory communicatively connected to the at least one processor;
    wherein the memory stores instructions executable by the at least one processor, and when the instructions are executed by the at least one processor, the at least one processor is enabled to perform the followings:
        obtaining a first calling key-value pair sent by a first component in a distributed system, wherein the first calling key-value pair comprises a first key code value and a first keyword value, the first key code value is configured to uniquely represent a first calling associated with the first component, and the first keyword value is configured to represent total calling data of the first calling; and determining a current running state of the first component according to the first keyword value and historical calling data corresponding to the first key code value in a preset database, wherein the first keyword value comprises a total number of times the first calling has been executed and a total consumed time of the first calling; and determining the current running state of the first component according to the first keyword value and the historical calling data corresponding to the first key code value in the preset database, comprises:

determining a query per second, an average consumed time and a quantile consumed time of the first component according to the total number of times the first calling has been executed, the total consumed time of the first calling, a historical total number of callings and a historical total consumed time corresponding to the first key code value in the preset database.

9. The device of claim 8, wherein the at least one processor is further enabled to perform the following:

updating a second keyword value corresponding to the first key code value in the preset database according to the first keyword value and the current running state of the first component.

10. The device of claim 8, wherein the at least one processor is further enabled to perform the following:

in response to that the preset database does not contain the historical calling data corresponding to the first key code value, determining the current running state of the first component according to the first keyword value.

11. The device of claim 8, wherein the first key code value comprises an identifier of the first component, a calling method name, a first current link identifier and a first parent link identifier.

12. The device of claim 11, wherein the at least one processor is further enabled to perform the following:

obtaining a second calling key-value pair sent by a second component in the distributed system, wherein the second calling key-value pair comprises a second key code value, and the second key code value comprises an identifier of the second component, a calling method name, a second current link identifier and a second parent link identifier; and in response to the calling method name in the second key code value being the same as the calling method name in the first key code value, the second parent link identifier in the second key code value being the same as the first current link identifier, and the first component calling the second component, updating a topology relationship between the first component and the second component according the first calling key-value pair.

13. The device of claim 11, wherein the at least one processor is further enabled to perform the following:

obtaining a second calling key-value pair sent by a second component in the distributed system, wherein the second calling key-value pair comprises a second key code value, and the second key code value comprises an identifier of the second component, a calling method name, a second current link identifier and a second parent link identifier; and in response to the calling method name in the second key code value being the same as the calling method name in the first key code value, the second current link identifier in the second key code value being the same as the first parent link identifier, and the second component calling the first component, updating a topology relationship between the first component and the second component according the second calling key-value pair.

14. A non-transitory computer-readable storage medium having computer instructions stored thereon, wherein the computer instructions are configured to cause a computer to perform the followings:

obtaining a first calling key-value pair sent by a first component in a distributed system, wherein the first calling key-value pair comprises a first key code value and a first keyword value, the first key code value is configured to uniquely represent a first calling associated with the first component, and the first keyword value is configured to represent total calling data of the first calling; and determining a current running state of the first component according to the first keyword value and historical calling data corresponding to the first key code value in a preset database, wherein the first keyword value comprises a total number of times the first calling has been executed and a total consumed time of the first calling; and determining the current running state of the first component according to the first keyword value and the historical calling data corresponding to the first key code value in the preset database, comprises:

determining a query per second, an average consumed time and a quantile consumed time of the first component according to the total number of times the first calling has been executed, the total consumed time of the first calling, a historical total number of callings and a historical total consumed time corresponding to the first key code value in the preset database.

* * * * *